Feb. 27, 1962 R. P. MILLS 3,023,299
ELECTRICAL WATER HEATERS
Filed Aug. 11, 1959
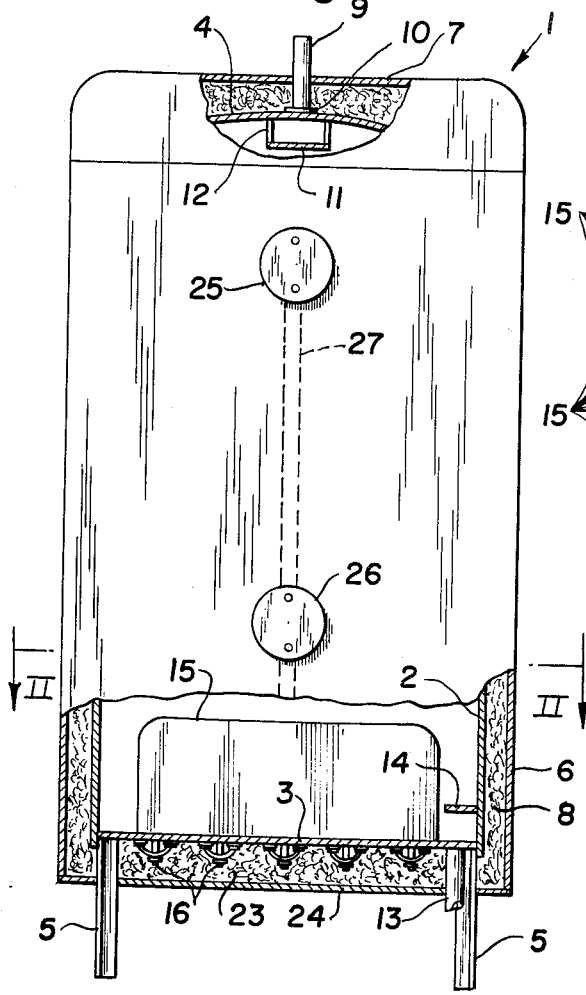
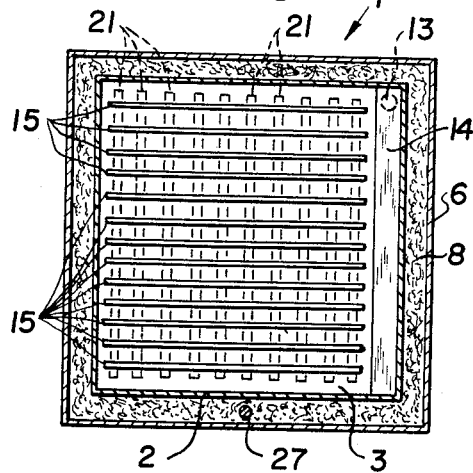
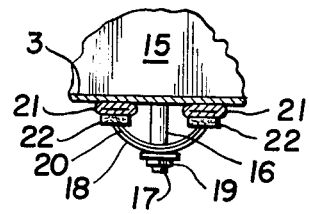
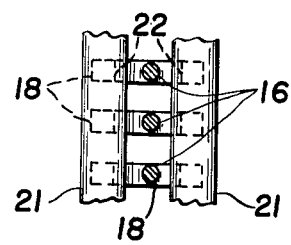
INVENTOR.
Raymond P. Mills
BY
Christy, Parmelee & Strickland
ATTORNEYS

United States Patent Office 3,023,299
Patented Feb. 27, 1962

3,023,299
ELECTRICAL WATER HEATERS
Raymond P. Mills, R.D. 2, Box 89, Latrobe, Pa.
Filed Aug. 11, 1959, Ser. No. 833,087
2 Claims. (Cl. 219—38)

The present invention relates generally to the use of electrical energy in heating water within closed containers such as form the boiler of a central heating plant for residences, or for storage of heated water for other domestic and cleaning purposes. More specifically, the invention relates to the electrical heating elements and the associated water container construction for economical use of electrical energy for the intended purpose.

The use of electrical power for heating water is desirable for domestic use due to its cleanliness, ready adaption to safety devices against fire and other hazards, compactness of the installation and its flexibility to satisfy fluctuations in demand for uniform heating to desired temperatures.

Where the heated water is circulated in a closed circuit, as in residential heating, with the heater disposed in remote relation to a plurality of radiators located throughout an area to be heated, thermostats located at strategic points throughout the residence may be used to control the input of power to the heater resulting in economy of operation and supply of water of the desired temperature to remote areas.

In a central heating system, water leaving the heating boiler and passing through a plurality of radiators connected in series, progressively loses heat as it moves through successive radiators. Thus, the water entering a radiator most remote from the boiler is at lower temperature than water entering the radiator nearest the boiler. Where a plurality of groups of radiators have each group directly supplied with heated water, the room temperatures, where different groups of radiators are located, may vary so that boiler water temperatures desired at one period of time may not be necessary at other periods. Electrical heating is admirably suited to this purpose.

One object of the invention is to provide electrical heating elements out of contact with the water to provide uniform efficiency of heating at all desired degrees of water temperature.

Another object of the invention is to provide a heat exchange unit in contact with the water and with the heating elements for efficient heating and distribution of cold water entering the boiler.

Another object of the invention is to provide an effective means for mounting such heating elements upon an insulated metal water boiler so as to afford a high degree of efficiency and in such a manner as to give ready access for servicing.

Another object of the invention is to provide a mounting for the heating elements upon the metal surface of the water boiler which accommodates itself to expansion and contraction of the metal surface during temperature changes in the water.

A further object of the invention is to provide a plurality of electrical heating elements which may be actuated as a whole or in groups to provide accelerated heating of the water with efficient operation of the heat exchange unit under all conditions of operation of the heating elements.

These and other objects of the invention will be made apparent from the following description and the drawing forming a part thereof, wherein:

FIG. 1 shows a front elevation view of the heater, partly in section;

FIG. 2 shows a cross-section through the heater taken on lines II—II of FIG. 1, with the heating elements indicated by dotted lines;

FIG. 3 shows an enlarged end view of a heating element; and

FIG. 4 shows a plan view of FIG. 3.

Referring now in detail to the drawing, the heater indicated generally as 1, comprises a rectangular boiler having vertical walls 2, bottom wall 3 and top wall 4 forming a water-tight enclosure. A suitable support for the heater may comprise four vertical legs 5 secured thereto in any suitable manner. Enclosing the boiler is a casing having vertical side walls 6 and connecting top wall 7, both disposed in spaced relation to the boiler and suitable insulation 8 filling the said space between said boiler and casing walls. Extending through the casing and boiler top wall is a suitable water outlet pipe 9 attached in any suitable manner to the boiler top wall as at 10. Extending transversely of the boiler top wall and outlet pipe 9, in spaced relation thereto, is a water baffle plate 11 supported from the adjacent boiler top wall by any suitable means such as the spaced hangers 12.

The boiler bottom wall 3 has a water inlet pipe 13 extending therethrough, preferably adjacent one side wall, and overlying the inlet pipe 13 is a cold water baffle plate 14 in spaced relation thereto. Baffle plate 14 may be suitably secured in place by any suitable means, as by welding to the side wall 2. Heat exchanger plates 15 extend transversely of the boiler bottom wall 3 in spaced relation to the opposite side wall 2 and adjacent baffle plate 14. Plates 15 are likewise spaced transversely of the boiler bottom wall 3 between the opposite boiler side walls in spaced relation thereto and to each other. Each baffle plate 15 preferably has a continuous flat bearing upon bottom wall 3 throughout the length of each plate 15 and is securely attached to the bottom plate 3. The greater the area of plate 15 in contact with bottom wall 3, the greater the heat conductive efficiency of the plates 15.

Beneath the boiler bottom wall and mounted on the outer face thereof are a plurality of studs 16 spaced parallel to and longitudinally of angularly disposed side walls of boiler 1. Each stud 16 is secured to plate 3 by any suitable means. Stud end portion 17 is preferably threaded to receive a nut 19 for retaining the heating element clamp in assembled relation with the stud.

The heating element mounting clamp 18 comprises an arcuate bi-metallic member 20, which may be comprised of steel and copper, or other suitable metals having different linear thermal expansion characteristics for this purpose. The steel forming the inner face and copper forming the outer face of the bi-metallic member 20. The heating elements 21 may be of any suitable shape and capacity. That is, they may be rectangular extending the full transverse width beneath the bottom boiler wall 3 to span all of the heat exchanger plates 15, or may be circular and span only a few of the plates 15. In any event, the elements 21 are held in intimate contact with bottom plate 3 by means of clamps 18 and insulating blocks 22 which latter may be of any suitable material. I have found a commercially available asbestos composition material to be suitable. The bi-metallic members 20 have an opening intermediate their ends for mounting upon shank end portion 17 and are retained in place by the nut 19. The ends of member 20 engage the blocks 22 which press the heating element 21 against the outer face of bottom plate 3. The members 20 being arcuate having their mid-portions spaced about the threaded portions of studs 16, permitting pressure to be applied to the clamps by nut 19 and in turn transmitting such pressure to the blocks 22. These heating units 21 and clamps may be enclosed by suitable insulation 23 held in place by a removable plate 24 which may be held in place by any suitable means.

The wiring circuits and thermostat controls therefor may be selected for any arrangement desired. As shown in FIG. 1 of the drawing, thermostats 25 and 26 may be embedded in the insulation surrounding the boiler and connected by suitable wiring disposed in a conduit 27 which extends downwardly below the boiler bottom plate 3. Suitable wiring may be run from any suitable power source (not shown) to activate the heating elements 21. The upper thermostat 25 may be suitably connected in circuit with thermostat 26 so that thermostat 26 will open when the water in boiler 1 reaches any pre-selected temperature and close below that temperature. Thermostat 26 may be connected with a remotely located heat-sensing means (not shown) in the area to be heated. When the heat-sensing means calls for a supply of hot water, it closes thermostat 26 connecting the elements 21 to the power source and opens to cut off power when the desired temperature at the heat-sensing means is obtained. Thermostats 25 and 26 may be connected in series for this purpose.

The heating elements 21 may be wired into two circuits connecting with the outside power source, with alternate elements 21 connected in each circuit whereby under certain outside temperatures, one-half the heating elements may be energized and at lower outside temperatures all elements 21 will be energized. In this manner the heat input to the boiler may be doubled where desired.

The heater herein described provides a simple, compact unit which is readily serviced. By removing cover plate 24, the insulation surrounding the heating elements may be dropped and free access had to the elements 21 and the circuits controlling same.

When the heating elements 21 are activated and the bottom wall 3 of the boiler expands, the bi-metallic members 18 also become heated and expanding, exert additional pressure upon the insulating blocks 22, keep the heating elements 21 in contact with the boiler bottom wall 3 for most efficient heating thereof.

The colder water entering boiler 1 through inlet pipe 13 first impinges upon baffle plate 14 and is deflected laterally therefrom about the heat transfer plates 15. This colder water contacting the heated bottom wall 3 and heated plates 15 transfers the heat to the incoming water. It is well known that in heating by conduction, the rate of heat transfer is greatest when a large temperature differential exists between water and metal.

The heater as shown by the drawing is by way of illustration and not limitation, and it is understood that those skilled in the art will readily recognize modifications may be made in the details of construction without departing from the invention and I intend to cover all such modifications as may come within the scope of the appended claims.

I claim:

1. In a boiler for hot water heating systems in combination, a metal water container having vertical connected side walls and closed top and bottom walls, an outlet pipe extending through said top wall, an inlet pipe extending through said bottom wall adjacent one side wall, a baffle plate overlying said inlet pipe for deflecting incoming water laterally over said bottom wall, spaced heat exchanger plates extending transversely of said bottom wall from adjacent said baffle plate, each said heat exchanger plate having its bottom edge in contact with and secured to the adjacent inner face of the bottom wall, substantially rectangular heating element disposed upon the outer face of said bottom wall beneath said heat exchanger plates, each said heating elements being engaged by a plurality of bi-metallic members of different expansion characteristics initially exerting pressure upon the heating element to maintain contact with the said bottom wall at room temperatures and maintaining continuous pressure upon the elements under all increased temperature conditions, a casing enclosing the boiler side and top walls in spaced relation thereto and insulation filling said space, a casing plate disposed beneath said boiler bottom wall in spaced relation to said heating elements and insulation filling said space.

2. In an electric water heater, in combination, an inner water containing receptacle having metal side and bottom walls, a plurality of laterally spaced electrical heating elements extending transversely of the outer face of said bottom wall between opposite sides thereof, a plurality of post members secured to the outer face of said bottom wall and extending outwardly therefrom between adjacent pairs of said heating elements, a bi-metallic member mounted in fixed relation to each post in spaced relation to said bottom wall and having diverging bi-metallic portions extending towards said bottom wall in engagement with and maintaining said adjacent pairs of heating elements in linear contact with said bottom wall.

References Cited in the file of this patent

UNITED STATES PATENTS

| | | |
|---|---|---|
| 1,864,887 | Bodenstab | June 28, 1932 |
| 2,013,914 | Hartmann | Sept. 10, 1935 |
| 2,248,812 | Cretors | July 8, 1941 |
| 2,448,183 | Koppel | Aug. 31, 1948 |
| 2,763,764 | Vidalenq | Sept. 18, 1956 |
| 2,779,855 | Sawyer | June 29, 1957 |
| 2,875,315 | Pierson | Feb. 24, 1959 |
| 2,919,338 | Covault et al. | Dec. 29, 1959 |

FOREIGN PATENTS

| | | |
|---|---|---|
| 290,134 | Great Britain | May 10, 1928 |